United States Patent
Ober et al.

(10) Patent No.: US 6,397,331 B1
(45) Date of Patent: May 28, 2002

(54) METHOD FOR EXPANDING SECURE KERNEL PROGRAM MEMORY

(75) Inventors: Timothy Ober, Atkinson, NH (US); Peter Reed, Beverly, MA (US)

(73) Assignee: SafeNet, Inc., Baltimore, MD (US)

( * ) Notice: Subject to any disclaimer, the term of this patent is extended or adjusted under 35 U.S.C. 154(b) by 0 days.

(21) Appl. No.: 09/154,323

(22) Filed: Sep. 16, 1998

Related U.S. Application Data

(60) Provisional application No. 60/054,841, filed on Sep. 16, 1997, and provisional application No. 60/054,082, filed on Sep. 16, 1997.

(51) Int. Cl.$^7$ .................................................. H04L 9/00
(52) U.S. Cl. ...................... 713/164; 713/165; 713/167; 717/10
(58) Field of Search .......................... 713/187, 164–167; 717/10

(56) References Cited

U.S. PATENT DOCUMENTS

| | | | |
|---|---|---|---|
| 4,987,595 A | | 1/1991 | Marino, Jr. et al. |
| 5,136,709 A | * | 8/1992 | Shirakabe et al. ............ 717/10 |
| 5,465,299 A | * | 11/1995 | Matsumoto et al. ........ 713/176 |
| 5,557,346 A | | 9/1996 | Lipner et al. |
| 5,572,590 A | * | 11/1996 | Ches .......................... 713/200 |
| 5,584,032 A | * | 12/1996 | Hyatt .......................... 711/100 |
| 5,619,724 A | * | 4/1997 | Moore ............................ 710/9 |
| 5,623,545 A | | 4/1997 | Childs et al. |
| 5,631,960 A | | 5/1997 | Likens et al. |
| 5,692,047 A | * | 11/1997 | McManis ..................... 713/167 |
| 5,721,777 A | | 2/1998 | Blaze |
| 5,757,914 A | * | 5/1998 | McManis ..................... 713/187 |
| 5,815,707 A | * | 9/1998 | Krause et al. .............. 709/321 |
| 5,841,866 A | * | 11/1998 | Bruwer ......................... 705/66 |
| 5,950,221 A | * | 9/1999 | Draves et al. .............. 711/100 |
| 6,094,691 A | * | 7/2000 | Burgard ........................ 710/14 |

* cited by examiner

Primary Examiner—Gilberto Barron, Jr.
Assistant Examiner—Steve Kabakoff
(74) Attorney, Agent, or Firm—Hoffmann & Baron, LLP

(57) ABSTRACT

A method of expanding a secure kernel memory area to accommodate additional software code includes the step of digitally signing the additional code by a trusted authority. The code has a digital signature to authenticate the source of the code and to control what code can be added to the secure kernel. The new code is copied into an unprotected memory where the digital signature is verified. The digital signature includes a unique integrated circuit (IC) identification number, which provides the IC manufacturer with the ability to control the secure kernel memory expansion of all or each of the ICs. If the code is authenticated via the digital signature, then those memory blocks are locked-in as protected memory and thus given "secure kernel" privileges.

3 Claims, 1 Drawing Sheet

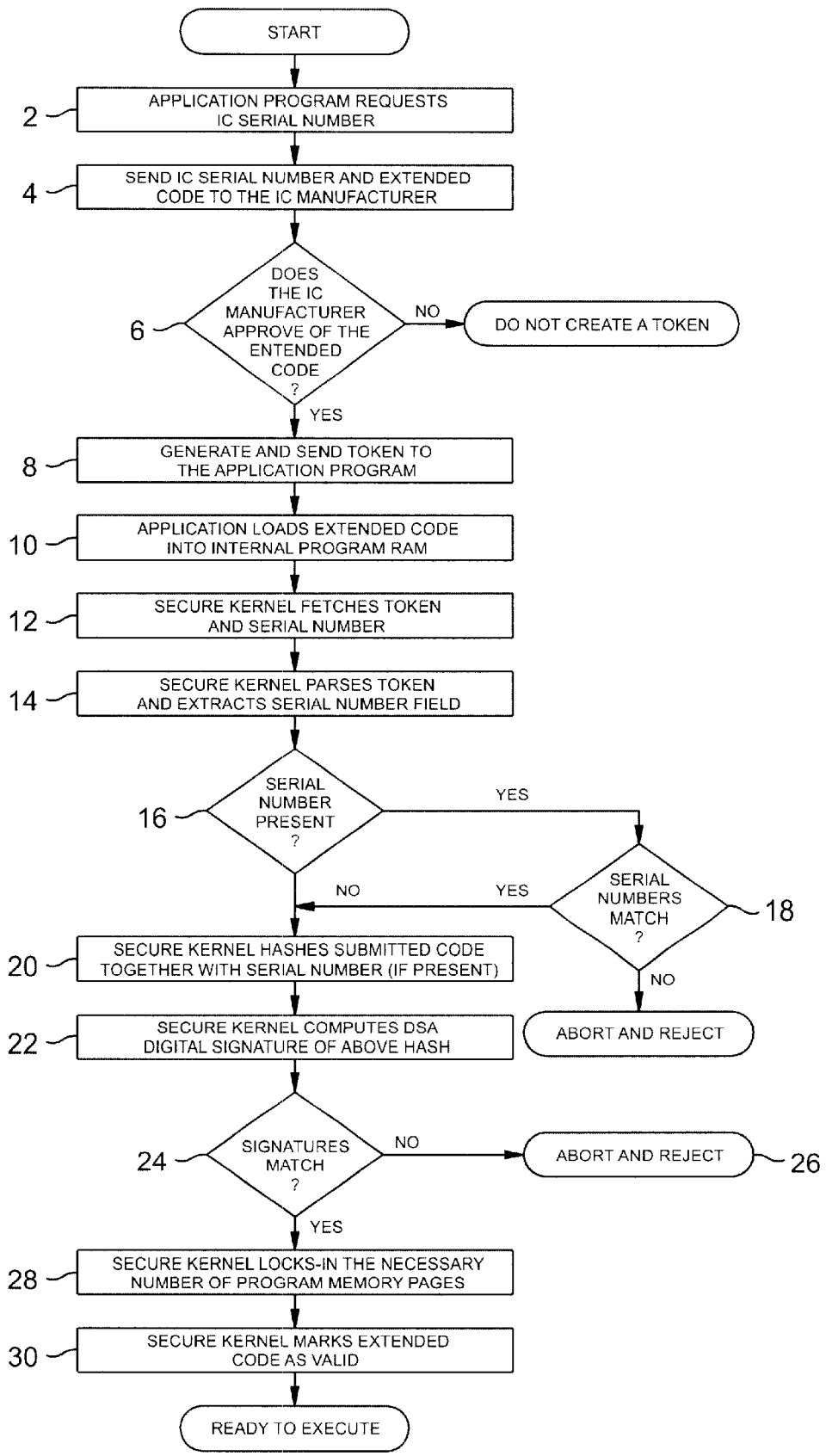

METHOD FOR EXPANDING SECURE KERNEL PROGRAM MEMORY

CROSS-REFERENCE TO RELATED APPLICATIONS

This application is based on U.S. Provisional Patent Application Ser. Nos. 60/059,841 and 60/059,082, each of which was filed on Sep. 16, 1997, and relates to U.S. Patent Application entitled "Cryptographic Co-Processor" and U.S. Patent Application entitled "Method of Expanding Protected Memory In An Integrated Circuit", each of which is concurrently filed herewith, the disclosures of all of which are incorporated herein by reference.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

1. Field Of The Invention

The present invention relates generally to a method of expanding a secure kernel memory area, and more particularly relates to a method of expanding a secure kernel memory area into an unprotected memory area while testing for validation and providing protection to the newly acquired memory area.

2. Description Of The Prior Art

Software developers attach a digital signature to their software code to protect users from code that has been modified. The modification may occur during or after the manufacturing process. Digital signatures are attached to each software package during the final stages of the manufacturing process. Each signature has a data item which accompanies a digitally encoded message and is used to determine if the code has been modified. Before the user is permitted to load the entire software package on to a computer, the digital signature must be checked for authenticity. This is accomplished by comparing the digital signature within the code to a digital signature provided by the user. If the software code has been tampered with or a computer virus has attacked the code, the digital signature within the code will be altered. A difference between the two digital signatures indicates that data integrity has been breached and the software is prevented from being loaded into the computer.

OBJECTS AND SUMMARY OF THE INVENTION

It is an object of the present invention to provide a method of expanding a secure kernel memory area into an unprotected memory location while testing for validation and providing protection to the newly acquired memory area.

It is an object of the present invention to provide a method for adding new authorized encryption algorithms to a secure kernel while providing the new algorithms with the same security as mask-programmed cryptographic algorithms.

It is another object of the present invention to provide flexible memory protection that can only be accessed by a super user, for example, the manufacturer of the integrated circuit having the protected and unprotected memories.

It is an object of the present invention to provide a manufacturer with flexibility and control over the addition of code to an existing system.

A method of expanding a secure kernel memory area formed in accordance with the present invention includes the step of signing an application program or encryption algorithm with a digital signature. This is required so that the manufacturer of an integrated circuit (IC) containing a secure kernel memory can control code that is added to the secure kernel memory. It also prevents unauthorized access to the secure memory area. The IC manufacturer generates a digital signature using its private key. The digital signature is verified by the secure kernel in the end product (e.g., router, modem, cellular phone) in which the IC is being used using a public key, which is stored in a read only memory (ROM) within the IC. The secure kernel verifies the digital signature and if it is valid, the secure kernel locks the expanded memory into protected mode and loads the new code. If the signature is invalid, the request is denied.

BRIEF DESCRIPTION OF THE DRAWING

The FIGURE is a flowchart of a method of expanding a secure kernel program memory space.

DETAILED DESCRIPTION OF THE INVENTION

A flowchart of the method of expanding a secure kernel memory area into an unprotected memory area formed in accordance with the present invention is illustrated in the figure. The method provides a mechanism for expanding a secure kernel memory area into an unprotected memory area, while providing security to the newly acquired memory and validation of new kernel code.

A secure kernel program is mask programmed into preferably a 32K word (word=24 bits) read only memory (ROM) located within a general purpose processor. The processor has preferably 16K words (word=16 bits) of data random access memory (RAM) and 16K word (word=24 bits) of program RAM available for applications. The kernel ROM is protected by hardware that prevents direct access to the kernel by an application. The hardware provides a shared memory area where commands and arguments can be passed between the application and the secure kernel. To accommodate an additional cryptographic algorithm or other kernel extension, the IC manufacturer or an original equipment manufacturer (OEM) of whose product the IC is a component (such as in a router, modem, cellular phone, etc.) may expand the size of the secure kernel memory space. This is accomplished by expanding into the internal processor program memory space and/or data memory space, which would otherwise have been used for an application program. The data memory and the program memory are preferably partitioned into 1K word (word=16 bits) blocks.

An additional cryptographic algorithm or other kernel extension (i.e., extended code) is required to be signed by a trusted authority before it can be down loaded into the newly acquired memory. This method employs a digital signature to authenticate the kernel extension by embedding the signature in a token which is presented along with the new code. Each integrated circuit having the secure kernel memory and unsecured memory is identified by a unique factory programmed identification code, making it possible to single out a specific integrated circuit. The creation of the kernel extensions is controlled to prevent the down loading of illegal or untrusted cryptographic algorithms into the integrated circuit (IC).

Referring to the figure, to down load the new cryptographic algorithm, or other kernel extension, the application software first requests the serial number of the IC using a command provided within the IC, as shown in Block 2. The preferred serial number is a hash of a local storage variable (LSV). The LSV is a unique variable that is set by burning fuses within the IC during the manufacturing process. Once the OEM retrieves the serial number, the OEM sends the serial number and the extended code to the manufacturer of the IC, as indicated in Block 4. In Blocks 6 and 8, if the manufacturer approves of the extended code, a token is generated and sent to the OEM. The token includes the serial number, digital signature of the extended code created by the IC manufacturer. Having the serial number of the IC in the returned token is preferred so that only the IC requested to be extended in secure memory will be permitted by the IC manufacturer to do so, and not a different IC. If the IC manufacturer does not include the serial number in the return token, this preferably means that it approves a secure memory expansion for all ICs. In Block 10, the OEM application program loads the extended code and the token into an internal program random access memory (RAM) located within the IC.

The application program, in Block 10, executes a command (e.g., $CGX_{13}$ $LOAD_{13}$ EXTENDED) which transfers the extended code into the secure kernel. All interrupts are disabled to maintain the integrity of the process and to prevent someone from accessing the secure kernel and obtaining secure code. The secure kernel takes control of the process and fetches the token and the serial number (Block 12). A pointer to where the extended code is located in memory is passed into the secure kernel. The amount of memory requested and the token are also passed into the secure kernel with this command. In Block 14, the token is separated and the serial number field is extracted from the token. If a serial number is present, it is compared to the serial number within the IC, as shown in Blocks 16 and 18. If the serial numbers do not match, then the token was not directed to this IC and the process is aborted. This feature allows the IC manufacturer to target the extended code to selected ICs. Preferably, as shown in Block 16, if there is no serial number found when the token is parsed, it means that the extended code is approved to be downloaded into any or all ICs made by the IC manufacturer. If the serial numbers match, or there is no serial number, then the signature verification phase may begin.

The signature verification phase is a standard process which may be achieved in several different ways. In the preferred method, the kernel hashes the extended code together with the serial number and computes a Digital Signature Algorithm (DSA) digital signature of the hash, as indicated in Blocks 20 and 22. In Block 24, the computed signature block is verified against the signature passed in with the token. If they do not match, the process is aborted, as shown in Block 26. If they do match, then the code is considered to be valid and the secure kernel locks in the approved number of program memory pages, as indicated in Block 28. This is preferably achieved by setting a bit in the program memory reserve register to 1, for every 1K word block of program memory space used for the extended code. In Block 30, the secure kernel marks the extended code as valid and the code is ready to execute.

A computer program illustrating one form of the method of the present invention is provided herewith and is incorporated herein as part of the disclosure of the invention.

Although illustrative embodiments of the present invention have been described herein with reference to the accompanying drawing, it is to be understood that the invention is not limited to those precise embodiments, and that various other changes and modifications may be effected therein by one skilled in the art without departing from the scope or spirit of the invention.

What is claimed is:

1. A method of expanding secured memory into unprotected memory to define an additional secured memory area, the secured memory being expanded to accommodate storage of an extended code, the extended code being initially stored in the unprotected memory in a location which will become the additional secured memory area, the secured memory and the unprotected memory being portions of an integrated circuit, the integrated circuit having a serial number stored in a memory thereof, which comprises the steps of:

retrieving by an authorizing party the serial number stored in the memory of the integrated circuit and retrieving the extended code proposed to be stored in the requested expanded secured memory;

verifying by the authorizing party whether the extended code is acceptable to be stored in the expanded secured memory of the integrated circuit;

generating a token signal by the authorizing party and communicating the token signal to the integrated circuit, the token signal including at least a digital signature of the extended code, as computed by the authorizing party, receiving the token signal by the integrated circuit; parsing the token signal to separate the digital signature of the authorizing party;

verifying by the integrated circuit the digital signature of the authorizing party parsed from the token signal which, if verified, indicates that the authorizing party authorized the expansion of the secured memory by the integrated circuit; and invoking by the integrated circuit a command to expand the secured memory so that the additional secured memory area now encompasses the location of the unprotected memory where the extended code is stored.

2. A method of expanding a secured memory as defined by claim 1, wherein the token signal further includes the serial number of the integrated circuit, and wherein the method further comprises the steps of:

parsing by the integrated circuit from the token signal returned by the authorizing party the serial number of the integrated circuit; and verifying by the integrated circuit the serial number parsed by the token signal by comparing the parsed serial number with the serial number stored in non-volatile memory of the integrated circuit, thereby verifying whether the extended code is acceptable to be stored in the expanded secured memory of the integrated circuit.

3. A method of expanding a secure kernel memory area into an unprotected memory area, while providing security to the unprotected memory area and validating an extended code, the secure kernel memory area and the unprotected memory area forming portions of an integrated circuit, comprising the steps of:

obtaining a serial number associated with the integrated circuit by an application program;

transferring the serial number and the extended code to an authorizing party;

generating a token by the authorizing party if expansion of the secure kernel memory area is authorized, the token including at least one of the serial number, extended code, and a digital signature;

verifying that the digital signature is authentic by a secure kernel;

copying the extended code into the unprotected memory area if the digital signature is authentic;

invoking a command to expand the secure kernel memory area if the digital signature is authentic;

specifying which memory blocks are to be acquired from the unprotected memory area to expand the secure kernel memory area;

disabling further program access to those memory blocks acquired from the unprotected memory area to expand the secure kernel memory area if the digital signature is authentic;

designating those memory blocks acquired from the unprotected memory area to expand the secure kernel memory area as expanded secure kernel memory area; and permitting the secure kernel to access the expanded secure kernel memory area.

* * * * *